United States Patent [19]
Oskam et al.

[11] Patent Number: 6,019,803
[45] Date of Patent: Feb. 1, 2000

[54] METHOD FOR MAKING CARBON/ CERAMIC COMPOSITE ELECTRODES FOR CHARGE STORAGE UNITS

[75] Inventors: Gerko Oskam; Peter Charles Searson, both of Baltimore, Md.

[73] Assignee: The Johns Hopkins University, Baltimore, Md.

[21] Appl. No.: 08/861,559

[22] Filed: May 22, 1997

[51] Int. Cl.[7] ...................................... H01M 4/04
[52] U.S. Cl. ......................................... 29/623.5; 29/623.1
[58] Field of Search ............................... 29/623.5, 623.1; 429/231.8, 324

[56] References Cited

U.S. PATENT DOCUMENTS

| | | |
|---|---|---|
| 4,557,858 | 12/1985 | Galloway . |
| 4,822,700 | 4/1989 | Doddapaneni . |
| 5,215,942 | 6/1993 | MacKenzie et al. . |
| 5,403,462 | 4/1995 | Lev et al. . |
| 5,420,081 | 5/1995 | Mattes et al. . |

*Primary Examiner*—John S. Maples
*Attorney, Agent, or Firm*—Pillsbury Madison & Sutro LLP

[57] ABSTRACT

An electrochemical supercapacitor or lithium ion intercalation battery formed from carbon particles distributed in a carbon/ceramic composite paste preferably produced by sol-gel technology wherein the paste is shaped and contacted with a solvent and electrolyte salt followed by an optional washing with an aqueous or non-aqueous solution to remove residual organic solvent and salt and leaving a shaped composite having the internal microscopic surface area electrochemically accessible and useful for charge storage applications.

8 Claims, 6 Drawing Sheets

METHOD FOR MAKING CARBON/CERAMIC COMPOSITE ELECTRODES FOR CHARGE STORAGE UNITS

The invention described and claimed herein was supported by the U.S. Department of The Army under grant No. DAAL01-95-2-3531.

BACKGROUND OF THE INVENTION

1. Field of the Invention

The present invention relates to charge storage devices, such as electrochemical supercapacitors and lithium ion intercalation batteries, and to methods of preparation thereof. In particular, the invention relates to carbon/ceramic composites produced by sol-gel technology wherein the composite is pretreated with a solvent and an electrolyte salt which enables electrochemical accessibility to the internal microscopic surface area of the composite and form an electrode for charge storage units.

A technique has been developed for preparing carbon/ceramic composite electrodes with high active carbon surface area and excellent stability. The ceramic matrix consists of a silica-based gel that acts as a binder for small carbon particles. The properties of films formed from the composites, such as hydrophobicity, polarity, adhesion to substrates, rigidity, mechanical stability, and porosity, can be tailored for specific applications. This is achieved by chemical modification of the gel precursors and control over the gelation process parameters. A further advantage is that these ceramic binders are stable up to high temperatures.

2. Background Information

In current battery technology, the binder for carbon particles consists of organic polymers such as polyvinylidenefluoride (PVDF) and Teflon (PTFE). These materials lack the versatility in adjusting their physical properties, in contrast to the ceramic binders disclosed herein. Carbon/ceramic composite films were first reported by Lev and co-workers.

These authors successfully used the composite films as carbon electrodes for analytical electrochemistry and sensor applications [M. Tsionsky et al., Anal. Chem., 66 (1994) 1747; O. Lev et al. U.S. Pat. No. 5,403,462, Apr. 4, 1995].

The present invention is specifically focused on obtaining a high active carbon surface area in order to optimize this process for charge storage applications including supercapacitors and lithium ion intercalation electrodes for battery applications. Electrodes have been fabricated that are suitable for use in both applications.

SUMMARY OF THE INVENTION

According to the present invention, it has now been found that carbon/ceramic composites pretreated with an organic solution and an electrolyte salt produces carbon/ceramic composites having a high electrochemically accessible surface area in comparison with untreated composites. These solvent and electrolyte salt treated carbon/ceramic composites can be used for charge storage applications such as supercapacitors and lithium ion intercalation electrodes for battery applications.

Further, according to the invention, carbon/ceramic composites pretreated with an organic solution of solvent and electrolyte salt can be washed with an aqueous solution to form supercapacitors for use in aqueous electrolyte solutions.

In one embodiment of the invention, carbon/ceramic composites such as obtained by sol-gel technology are formed into a desired shape, for example a film, and contacted with a solution comprising an organic solvent and an electrolyte salt followed by washing with an aqueous solution to remove residual solvent and electrolyte salt and form a composite having a high active surface area that is electrochemically accessible and useful for supercapacitors in aqueous electrolyte solutions. In this embodiment, the preferred contacting solution is propylene carbonate as solvent and the preferred salt is tetrabutylammonium tetrafluoroborate ($TBA(BF_4)$). The preferred aqueous solution in this embodiment for supercapacitors is 1 M $LiClO_4$.

In a further embodiment of the invention, carbon/ceramic composites such as obtained by sol-gel technology are formed into a desired shape, e.g., a film on a substrate, and contacted, e.g., immersed, with an organic solvent and an electrolyte salt to form a carbon/ceramic composite film having a high surface area useful for supercapacitors and lithium ion intercalation electrodes in non-aqueous battery applications. In this embodiment propylene carbonate is the preferred solvent and $TBA(BF_4)$ and $LiClO_4$ are preferred electrolyte salts for the supercapacitors and lithium ion batteries respectively.

The carbon/ceramic composites can be produced in the form of thin layers, such as films on a substrate, monolithic rods or disks, microelectrodes, and the like prior to pretreatment with solvent and electrolyte salt according to the invention.

DETAILED DESCRIPTION OF THE INVENTION

The method of fabrication of carbon/ceramic composite films or other shapes and forms to be used as anodes in lithium ion batteries and as electrochemical supercapacitor electrodes described herein is unique in that controlled binder properties can be achieved by varying the preparation parameters, and the mechanical properties, the rigidity, the porosity and the stability at high temperatures of the final structure can be optimized for either lithium intercalation processes or supercapacitor applications. It is emphasized that these goals cannot be achieved with the organic binders (organic polymers) currently used, and that the inorganic binder system described herein offers exceptional flexibility in tailoring specific properties of the composite electrodes.

Carbon/ceramic composites for treatment according to the invention are preferably fabricated using a sol-gel method to prepare the ceramic network in which the carbon particles are interspersed. The silica sol is prepared by mixing an alkoxy silane precursor with methanol as solvent and hydrochloric acid as catalyst. The sol is then mixed with a high concentration of carbon particles which, after gelation, are incorporated in the resulting ceramic network. The gelation occurs through hydroxylation of the precursor by water in ambient air, and subsequent polymerization is achieved through condensation reactions in which alkanols are formed.

The overall reaction can be represented as follows:

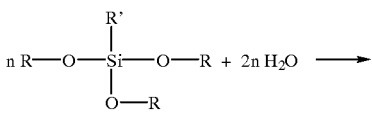

-continued

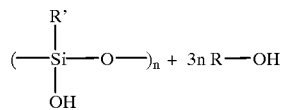

where the side groups R, R' can be methyl, ethyl, phenyl, and the like. By changing the side groups on the precursor molecules, the properties of the resulting gel, such as rigidity, porosity, and polarity, can be controlled and optimized for the specific applications described above.

The ceramic part of the carbon/ceramic composite film can be prepared using a variety of different precursors. The precursor molecule should contain preferably 3 or 4 alkoxy groups (O—R) where R can be alkyls ($C_nH_{2n+1}$: methyl, ethyl, propyl, etc.) which may have side-groups as well. If there are 3 alkoxy groups, then the remaining side-group to the silane can be, for instance, an alkyl, or a phenyl group. Most of the examples disclosed herein were prepared using methyltrimethoxysilane (MTMS).

Also, carbon/ceramic composite film using tetramethoxysilane (TMOS), triethoxyphenylsilane (TEPS), and trimethoxypropylsilane (TMPS) have been prepared: the films prepared with TMOS were very hard and brittle, those prepared with TEPS were hard and coherent, and those using TMPS were soft and somewhat sticky. These results show that carbon/ceramic composite film with different properties can be prepared by adjusting the precursor molecules.

The carbon component of the carbon/ceramic composite film can also be adjusted to optimize the properties of the film. For example, high quality graphite powder described in the examples and high surface area carbon powder can be used.

Representative examples of organic solvents that can be used include tetrahydrofuran (THF), propylene carbonate (PC), acetonitrile, dimethylsulfoxide, dichloromethane and acetone. Alternative electrolyte salts include combinations of the cations lithium, sodium or tetraalkylammoniunm, and anions such as perchlorate, tetrafluoroborate, and hexafluorophosphate. For the electrochemical supercapacitors, water can also be used as a solvent and electrolyte salts that can be used with water include sulfuric acid, and lithium and sodium salts with sulfate, perchlorate, and chloride.

The amount of solvent and electrolyte salt and conditions of temperature, time and mode employed to treat the composite are such that the internal microscopic surface area becomes electrochemically accessible.

Typically, the composite is treated by immersion in a bath in solvent and electrolyte salt for a period of time of about 15–30 minutes at ambient temperature and pressure. The concentration of electrolyte salt present in the solvent during treatment is usually about 0.2–1 M based on total composition.

In one embodiment, the composite is removed from the organic bath and washed with an aqueous solution containing an electrolyte salt, for example by immersion, at ambient conditions for a period of time sufficient to remove residual organic solvent and electrolyte salt remaining after pretreatment and form a composite in which the internal microscopic surface area is electrochemically accessible to aqueous solutions. After the pretreatment the carbon/ceramic composite now can be used for supercapacitor applications in aqueous electrolyte solutions.

The washing procedure with water is omitted in the preparation of lithium ion intercalation batteries; instead, the composite is washed by immersion in the organic solution which is used for the battery, such as propylene carbonate as solvent and 1 M $LiClO_4$ an electrolyte salt, or other combination of organic solvents and salts described above.

(□) aqueous 0.2 M $Na_2SO_4$; before exposure to PC+0.3 M $LiClO_4$ (Δ) PC+0.3 M $LiClO_4$ (○) aqueous 0.2 M $Na_2SO_4$; after immersion in PC+0.3 M $LiClO_4$ FIG. 3 demonstrate current-potential curves for steel mesh (a) and carbon/ceramic composite film on steel mesh in a 0.3 M $LiClO_4$ in propylene carbonate solution. The reference and counter electrodes were lithium metal. The scans were performed from 3 V to either (a) −0.15 V or (b) 0.05 V at a scan rate of 50 $mVs^{-1}$.

Figure 4:
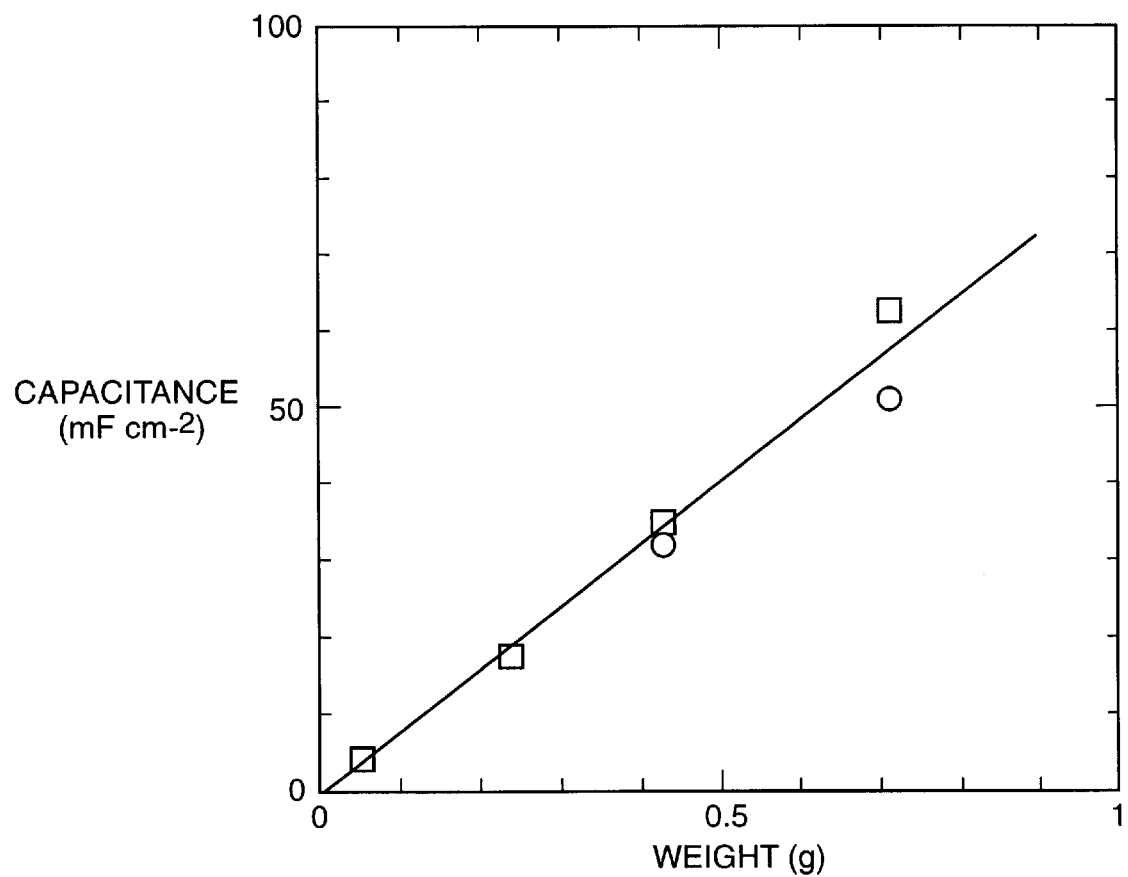

FIG. 4 shows capacitance of carbon/ceramic composite electrodes versus the weight of the films determined by both current-potential measurements (□) and impedance spectroscopy (o). The accessible capacitance is proportional to the film weight.

Figure 5:
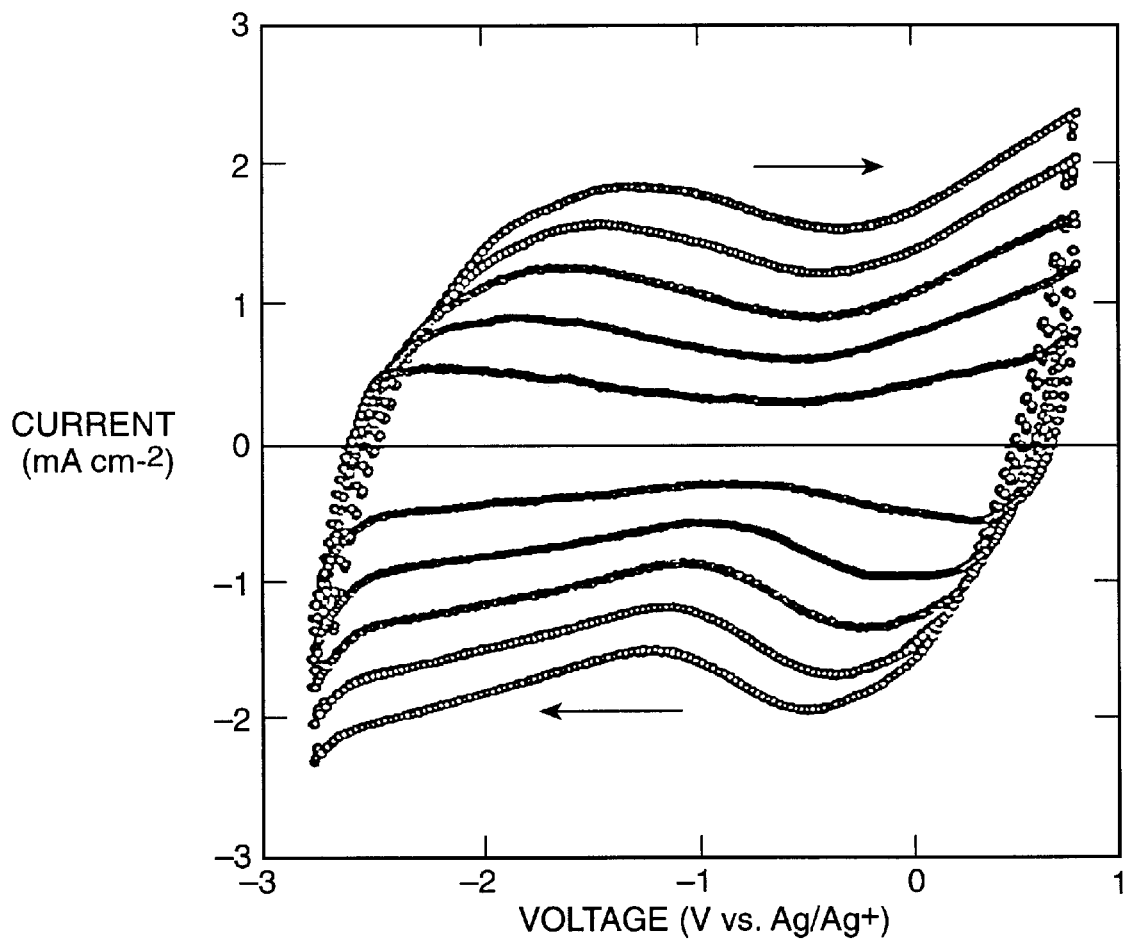

FIG. 5 illustrates current-potential curves in propylene carbonate+0.25 M TBA($BF_4$) for a carbon/ceramic composite electrode prepared by subsequent application of 4 layers. The scan rates were 5, 10, 15, 20 and 25 $mVs^{-1}$ from small to large (anodic and cathodic) current, respectively. The arrows show the direction of the scans.

Figure 2A:
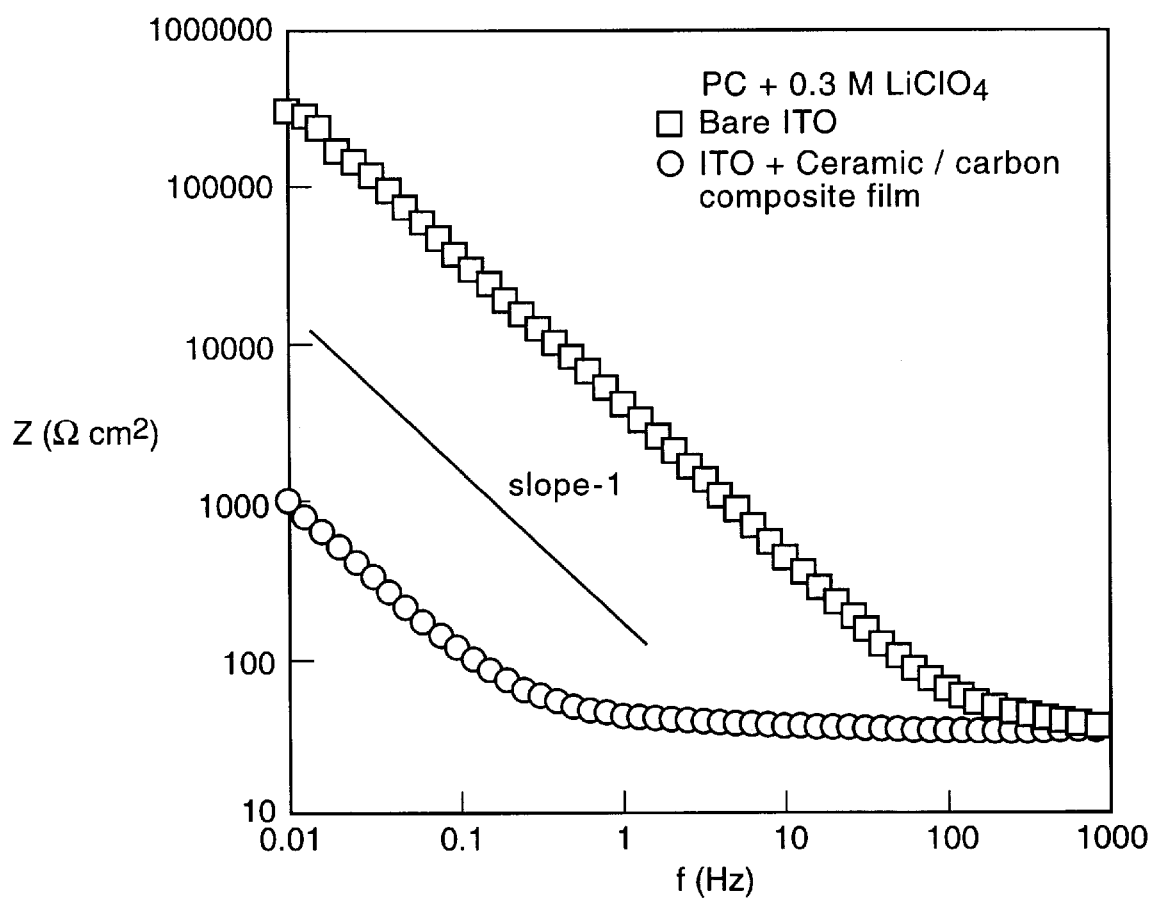
FIG. 2(a) illustrates the magnitude of the impedance (Z) versus the frequency (f) in propylene carbonate (PC) with 0.3 M $LiClO_4$: (□) bare ITO electrode; (o) ceramic/carbon composite film on an ITO substrate.
Figure 2B:
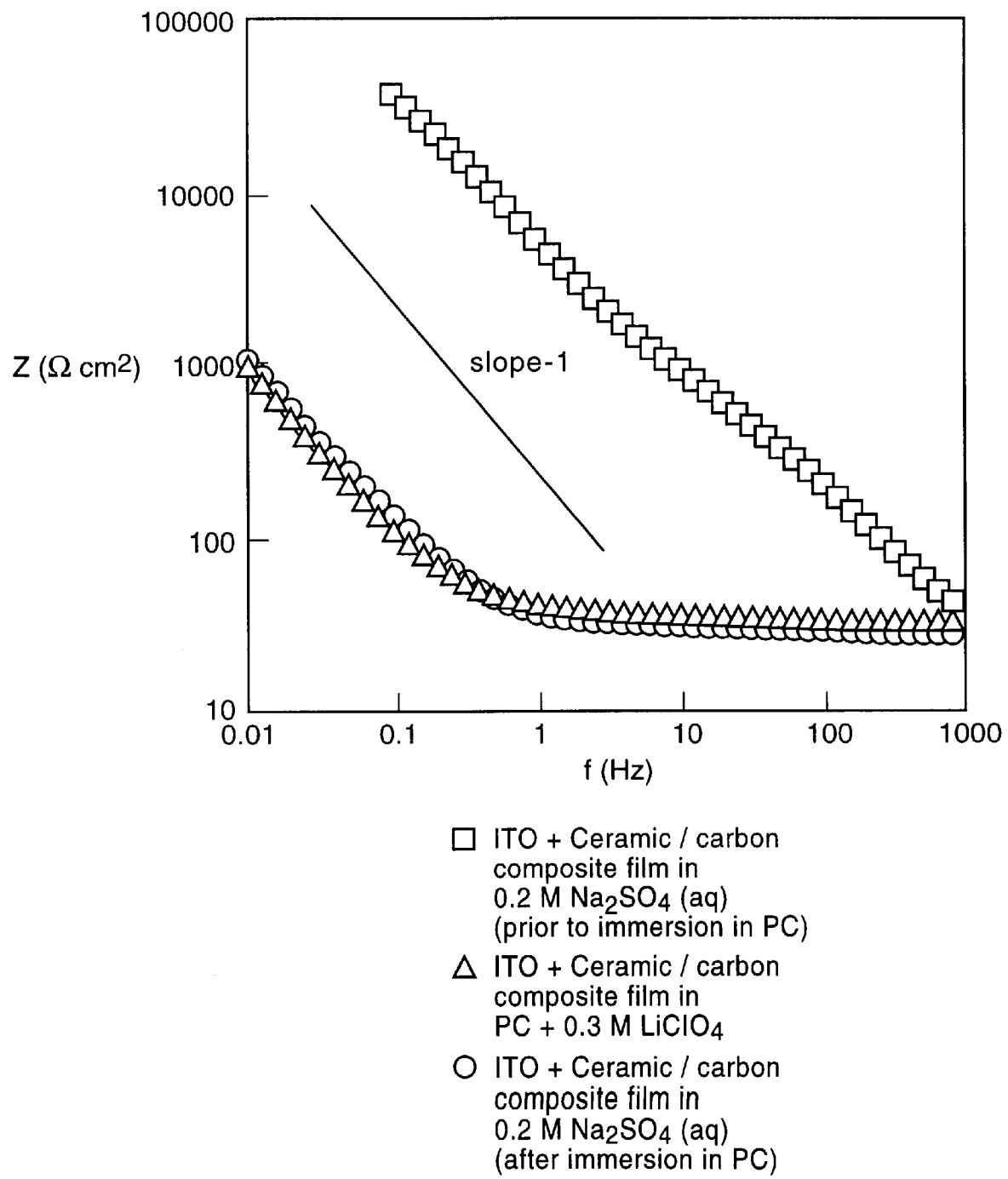
FIG. 2(b) shows log Z versus log f plots for a carbon/ceramic composite film on an ITO substrate.

The necessity of organic solvents for device fabrication is illustrated in FIG. 2b. The electrochemically accessible surface area of an as—prepared carbon/ceramic composite film in aqueous solution is equal to the macroscopic geometrical surface area: the water and salts are not able to penetrate the porous carbon/ceramic film. On the other hand, in propylene carbonate (PC) with lithium perchlorate ($LiClO_4$) as salt the entire internal microscopic surface area becomes electrochemically accessible, hence, only now the carbon/ceramic films are attractive for applications like supercapacitors. This difference is caused by the difference in wetting: water does not wet graphite, while PC does. Propylene carbonate is not unique in that sense and different organic solvents will work as well; PC was selected as the preferred solvent since it has a high dielectric constant which is attractive for electrochemistry. Similarly, TBA ($BF_4$) (tetrabutylammonium tetrafluoroborate) and $LiClO_4$ are preferred as electrolyte salts for the capacitors and lithium ion batteries, respectively.

After immersion in PC+salt, the film retains some of the PC and salt: if the film is subsequently immersed in an aqueous solution the water is exchanged with the PC resulting in good wetting. Consequently, the carbon/ceramic films can now also be used for supercapacitor applications based on aqueous solutions, which was impossible before treatment in the organic solvent+salt.

SPECIFIC EXAMPLES

Example 1

Carbon/ceramic composite films have been fabricated using methyltrimethoxysilane (MTMS) as a precursor: 2 ml MTMS was added to 4 ml of methanol (LIPLC grade) and shaken for 10 seconds; then 0.1 ml HCl was added and the solution was shaken for 20 seconds. To this solution, 4 g graphite particles (Ultra Carbon Corp., microcrystal grade graphite powder, 2–15 μm, purity 99.9999%) was added a small amount at a time while continuously stirring the mixture with a spatula; if the paste became too thick to warrant proper mixing, 1 ml of methanol was added: after adding the 4 grams of graphite, about 7 ml of methanol was added in conjunction. The total mixing procedure should not take longer than about minutes and the paste must be applied to a substrate immediately. Carbon/ceramic composite films were thus prepared by applying the black paste to fluorine-doped tin oxide (Libby-Owens-Ford, 8 Ω/□), copper or steel mesh substrates. After about 14 hours of gelation under ambient conditions, dark matte films were obtained. In order to use the carbon/ceramic composite films for supercapacitor applications, it needs to be pretreated in an organic solvent such as propylene carbonate with an electrolyte, such as $LiClO_4$ or $TBA(BF_4)$. Afterwards, either aqueous or non-aqueous solutions may be used.

The largest voltage window for the carbon/ceramic composite film electrode in a 3-electrode configuration (i.e., only the composite film is probed, not the counter electrode) was obtained in distilled, dried propylene carbonate with 0.3 M $TBA(BF_4)$. The voltage window was 4 Volt and the capacitance was 0.24 $Fg^{-1}$. This leads to a specific charge density of 0.27 mA h $g^{-1}$ and an energy density of 1 W h $kg^{-1}$. The capacitance of these supercapacitors can, therefore, be tailored by choosing the mass of the carbon/ceramic composite film, which is easy to do.

Example 2

Electrochemical supercapacitors have been fabricated using the method described above, using MTMS as precursor and $PC+TBA(BF_4)$ as solvent and electrolyte salt. The device consists of two carbon/ceramic composite films on steel mesh as substrate (one positive and one as negative electrode). The two electrodes were separated using ordinary filter paper (2 layers Grade 1; total about 5 mils thick); both the electrodes and the separator were soaked in the $PC+TBA(BF_4)$ electrolyte solution for about 3 minutes prior to assembly. The entire device was clamped between two glass microscope slides. The overall electrochemical supercapacitor showed a capacity of 12 mF $cm^{-2}$, corresponding to 0.22 F $g^{-1}$ for this device which agrees well in the value obtained from the 3-electrode measurements of 0.24 F $g^{-1}$ (see Example 1).

Example 3

Carbon/ceramic composite films have been fabricated using methyltrimethoxysilane (MTMS) as a precursor. An example of the fabrication method of the sol is as follows: 1.5 ml MTMS, 0.1 ml HCl, and 7 ml methanol were mixed and subsequently 3 g graphite particles (Ultra Carbon Corp., microcrystal grade graphite powder, 2–15 μm, purity 99.9999%) was added. This formulation was chosen to give about 20 weight % of the inorganic binder material, similar to the concentration of organic binder used in carbon films for lithium battery and supercapacitor applications. Carbon/ceramic composite films were prepared by applying the black paste to fluorine-doped tin oxide (Libby-Owens-Ford, 8 Ω/□), copper or steel mesh substrates. After about 14 hours of gelation under ambient conditions, dark matte films were obtained.

The conductivity of the films was measured using a two-point probe method and was generally found to be larger than 1 S $cm^{-1}$. Gas adsorption measurements were performed to determine the active surface area. For this purpose, free-standing carbon/ceramic composite films were prepared. BET measurements showed that the films were highly porous with an active surface area of 3.5 $m^2$ $g^{-1}$, which is essentially the same as for the graphite powder only which was determined to be about 7 $m^2$ $g^{-1}$.

Figure 1:
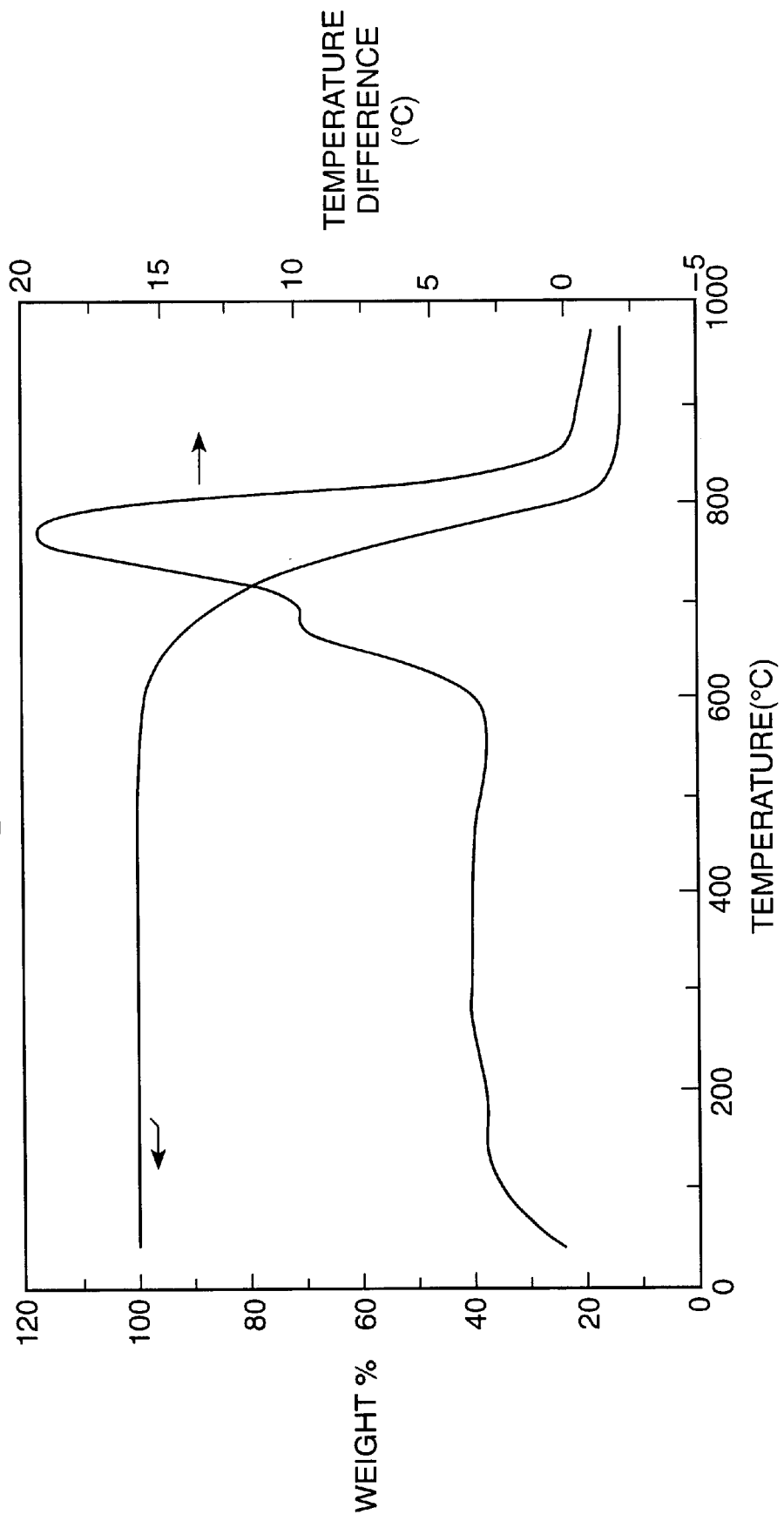
FIG. 1 illustrates differential thermogravimetric analyses of a free-standing carbon/ceramic composite film. The temperature was sweeped at a rate of 30° C. $min^{-1}$ in air and the weight loss and temperature difference was measured with respect to an inert reference material ($\beta$-$Al_2O_3$).

FIG. 1 shows the results of Differential Thermogravimetric Analysis (DTA/TGA) measurements performed in air on the same samples as used for the BET measurement. The results indicate that the films are chemically stable up to 750° C. At higher temperatures, the carbon, the methyl and the —OH groups are driven off and a white $SiO_2$ residue amounting to less than 15% of the initial weight remains after heating to 1000° C. This confirms that the silica gel network represents 19 weight % of the composite films, since the weight percentage of the gel is equal to the weight percentage of the $SiO_2$ multiplied by the molecular weights ratio of the repetitive unit of the gel and $SiO_2$ ($M_{gel}$=76.1 g $mol^{-1}$; $M_{SiO2}$=60.1 g $mol^{-1}$).

The active surface area for electrochemical applications was determined using electrochemical impedance spectroscopy (EIS). FIG. 2(a) shows the magnitude of the impedance (Z) versus frequency (f) for carbon/ceramic composite films deposited on ITO both in an aqueous 0.2 M $Na_2SO_4$ solution and in propylene carbonate (PC) with 0.3 M $LiClO_4$ at potentials where the steady-state current is close to zero. The electrodes were found to be electrochemically stable in both aqueous and non-aqueous solutions over a large potential range. Since the carbon electrodes are close to ideally polarizable in the potential range studied, the total impedance can represented by a resistor, R, in series with the double layer capacitance, C. Hence, at low frequencies, f, the magnitude of the total impedance, Z, is equal to (2 πf C)$^{-1}$ in which C scales with the accessible surface area for electrochemical applications. As a consequence, the relative accessible surface area can be obtained from the log Z versus log f plot in the frequency region where the slope is −1.

FIG. 2a shows that the accessible surface area of a carbon/ceramic composite film on a conductive glass (ITO) substrate in PC is about 300 times larger than that of a bare ITO electrode, which confirms that a large carbon surface area is accessible. FIG. 2b shows that a newly prepared carbon/ceramic composite film on ITO is not wetted by an aqueous solution as the Bode plot is almost identical to that for a bare ITO electrode. Hence, only the geometric surface area of the composite film is accessible. This allows one to determine the double layer capacitance per $cm^2$ for these carbon electrodes. Subsequently, the impedance was measured in PC and the active surface area of the carbon/ceramic composite film is much larger than in the aqueous solution. FIG. 2b shows that the film is wetted by water if the electrode is first immersed in PC+0.3 M $LiClO_4$.

From FIG. 2(b) it can also be concluded that the capacitance of the carbon electrode in PC is not appreciably different from that in aqueous solution. From weighing the film prior to the measurements and using the surface area per $m^2$ obtained from BET measurements, it is confirmed that the entire carbon surface area is accessible for electrochemical charging processes. In order to increase the total surface area, an electrode was fabricated which consisted of two films applied separately, allowing the first layer to gel completely before applying the second layer. The resulting carbon/ceramic film was about 1.7 mm thick and impedance measurements showed that the capacitance was 100 mF for a geometrical surface area of 3 $cm^2$. This value can be further enhanced by deposition of multiple layers of carbon/ ceramic composite. These results show that carbon/ceramic composite films are ideal for application in electrochemical supercapacitors.

Figure 3A:
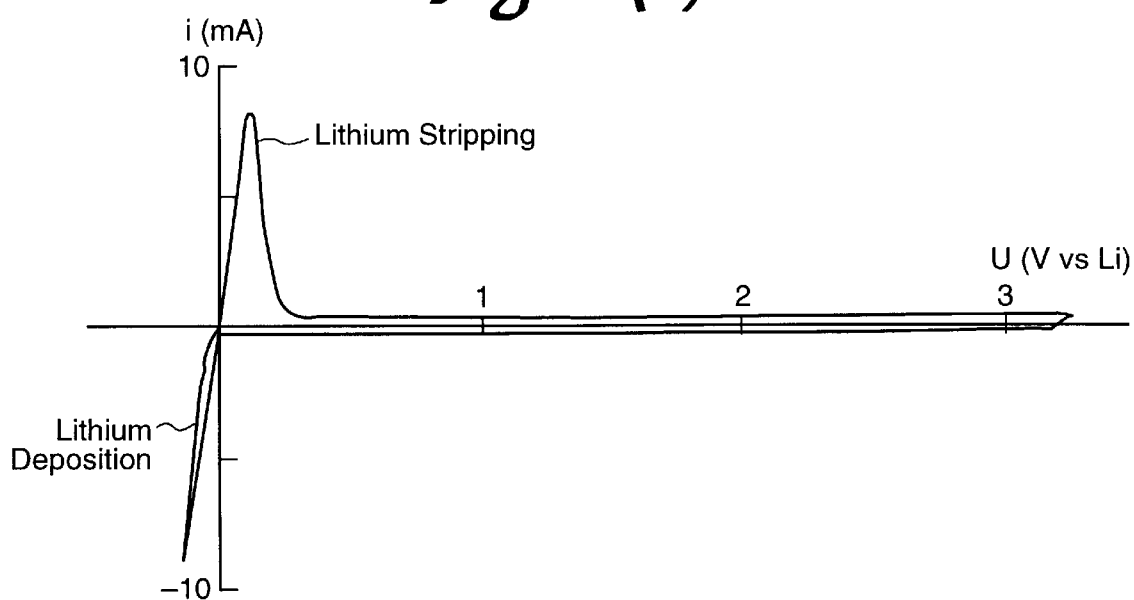

FIGS. 3(a) and (b) show the current-potential curves of carbon/ceramic composite films deposited on steel mesh in PC+0.3 M LiClO$_4$; the experiments were performed in a glovebox and lithium metal was used as counter and reference electrodes.

FIG. 3a shows the results for a bare steel mesh electrode. The starting potential was 3 V(Li) and on sweeping the potential in the negative direction the current remains small down to 0 V(Li). At more negative potentials lithium is deposited and on the reverse scan the dissolution of the lithium film is observed.

Figure 3B:
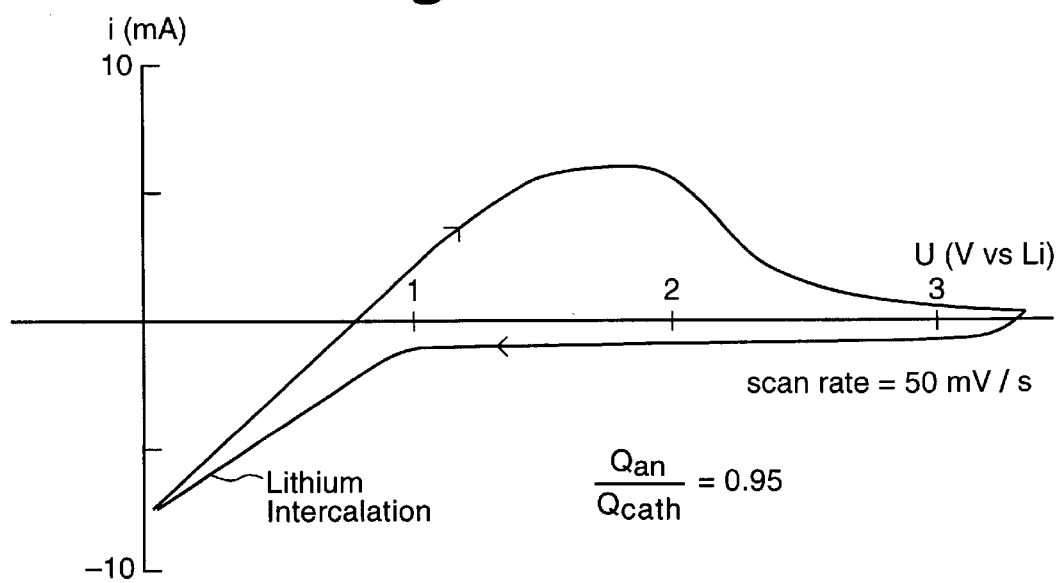

FIG. 3b shows the results for a carbon/ceramic composite electrode using the same method: the current is small down to 1 V(Li) and increases to −5 mA cm$^{-2}$ at 0.05 V(Li). On the reverse scan a broad reoxidation peak is observed. This current-potential curve is characteristic for lithium intercalation into graphite particles; the efficiency of the intercalation/deintercalation process was larger than 95%.

These results illustrated in FIGS. 3(a) and (b) show that carbon/ceramic composite films can be used as anodes in lithium intercalation batteries.

Thick carbon/ceramic electrodes can be prepared by successive application of additional layers. For this method to be successful, the carbon/ceramic films should remain porous and the total carbon active area should be proportional to the thickness and/or weight of the film. FIG. 2c shows the capacitance of carbon/ceramic electrodes obtained from both current potential and impedance measurements versus the weight of the (dry) films. The four electrodes were prepared by applying 1, 2, 3, and 4 layers, respectively, allowing 24 hours between the application steps. The capacitance of the electrodes is found to be proportional to the weight of the films, illustrating that the capacitance of electrochemical capacitors prepared by this method can be tailored towards a desired value. Moreover, it is feasible to fabricate electrochemical capacitors with capacities well over 100 mF cm$^{-2}$.

FIG. 5 shows current-potential curves for an electrode consisting of four successively applied layers in propylene carbonate with 0.25 M TBA(BF$_4$)(tetrabutylanmuonium tetrafluoroborate). The scan rates were 5, 10, 15, 20, and 25 mV s$^{-1}$ from small to large (anodic and cathodic) current, respectively. The curves are almost square indicative of purely capacitive behavior. Impedance spectroscopy showed that the anodic and cathodic waves at around −1.6 V and −0.4 V, respectively, do not correspond to Faradaic processes. The waves are rather related to a slight change of the double layer capacitance upon reversing the scan rate and is probably due to an adsorption process. The reversible double layer capacitance can be obtained from the simple relation C=i/v, where i is the current density in the plateau region and v is the scan rate. The capacitance determined by this method was found to be essentially equal to the value obtained from impedance spectroscopy (see FIG. 4). FIG. 5 also illustrates the potential window where the electrodes are stable: in propylene carbonate with TBA(BF$_4$) a 4 volt electrolytic capacitor can be realized.

What is claimed is:

1. A process for preparing carbon/ceramic composite for electrochemical supercapacitors and lithium ion intercalation batteries comprising:

(1) forming a carbon/ceramic composite into a desired shape, (2) contacting the shaped carbon/ceramic composite with an amount of an organic solution comprising an organic solvent and at least one electrolyte salt sufficient to wet carbon particles in the shaped composite and allow the internal microscopic surface area of the composite to become electrochemically accessible, and (3) removing residual solvent and electrolyte salt from the composite and form a carbon/ceramic composite electrode useful as a electrochemical supercapacitor or lithium ion intercalation battery.

2. A process according to claim 1, wherein the solvent comprises an organic solvent selected from the group consisting of propylene carbonate, tetrahydrofuran, acetonitrile, dimethylsulfoxide, dichloromethane and acetone.

3. A process according to claim 1, wherein the electrolyte salt is a combination of a cation selected from the group consisting of lithium, sodium and tetraalkylammonium with an anion selected from the group consisting of perchlorate, tetrafluoroborate and hexafluorophosphate.

4. A process according to claim 2 or 3, wherein the solvent is propylene carbonate and the electrolyte salt is lithium perchlorate (LiClO$_4$) or tetrabutylammonium tetrafluoroborate (TBA(BF$_4$)).

5. A method for producing electrochemical non-aqueous supercapacitors and lithium ion electrodes for intercalation batteries from a sol-gel derived carbon/ceramic composite which comprises contacting an electrode formed into a desired shape from the composite with a liquid solution comprising an organic solvent and an electrolyte salt in an amount and for a time sufficient to wet internal microscopic surface area of the electrode, and washing the electrode with an organic solution to remove residual organic solvent and electrolyte salt and form an electrode having substantially an entire microscopic surface area electrochemically accessible and being useful for non-aqueous superconductors and lithium ion intercalation batteries.

6. A method according to claim 5 for producing a non-aqueous electrochemical supercapacitor or lithium ion intercalation battery wherein the solvent is propylene carbonate and the electrolyte salt is TBABF$_4$ or LiClO$_4$.

7. A method for producing electrochemical non-aqueous supercapacitors and lithium ion electrodes for intercalation batteries from a sol-gel derived carbon/ceramic composite which comprises immersing an electrode formed into a desired shape from the composite into a liquid solution comprising an organic solvent and an electrolyte salt in an amount and for a time sufficient to wet internal microscopic surface area of the electrode, and optionally, washing the electrode with an organic solution to remove residual organic solvent and electrolyte salt and form an electrode having substantially an entire microscopic surface area electrochemically accessible and being useful for non-aqueous superconductors and lithium ion intercalation batteries.

8. A method according to claim 7 for producing a non-aqueous electrochemical supercapacitor or lithium ion intercalation battery wherein the solvent is propylene carbonate and the electrolyte salt is TBABF$_4$ or LiClO$_4$.

* * * * *